United States Patent [19]

Morrill

[11] Patent Number: 4,579,372

[45] Date of Patent: Apr. 1, 1986

[54] FLOWLINE CONNECTOR SEAL

[75] Inventor: Charles D. Morrill, Bellaire, Tex.

[73] Assignee: Smith International, Inc., Newport Beach, Calif.

[21] Appl. No.: 399,007

[22] Filed: Jul. 16, 1982

Related U.S. Application Data

[63] Continuation of Ser. No. 87,747, Oct. 24, 1979, abandoned, which is a continuation-in-part of Ser. No. 973,895, Dec. 28, 1978, abandoned.

[51] Int. Cl.$^4$ ............................................. F16L 39/00
[52] U.S. Cl. ...................................... 285/18; 285/93; 285/367; 285/DIG. 18; 285/DIG. 21; 285/137.2
[58] Field of Search ........ 285/137 R, 137 A, DIG. 1, 285/367, 366, 365, 18, 93, 351, 325, 363, DIG. 18; 277/2, 235 B

[56] References Cited

U.S. PATENT DOCUMENTS

| | | | |
|---|---|---|---|
| 2,513,178 | 6/1950 | Jackson | 285/363 |
| 2,570,545 | 10/1951 | Hamer | 285/363 X |
| 2,834,368 | 5/1958 | Gray | 137/271 |
| 3,068,895 | 12/1962 | Grove | 137/594 |
| 3,234,963 | 2/1966 | Lyon | 137/668 |
| 3,407,834 | 10/1968 | Brandenberg | 137/271 |
| 3,419,071 | 12/1968 | Williams, Jr. et al. | |
| 3,481,396 | 12/1969 | Williams et al. | 285/18 X |
| 3,503,634 | 3/1970 | Cadiou | 285/137 R |
| 3,592,014 | 7/1971 | Brown | |
| 3,625,250 | 12/1971 | Flaschar | 137/271 X |
| 3,637,223 | 1/1972 | Weber | 285/DIG. 17 X |
| 3,710,859 | 1/1973 | Hanes et al. | |
| 3,712,645 | 1/1973 | Herter | 285/DIG. 1 X |
| 3,722,585 | 3/1973 | Nelson et al. | 285/29 |
| 3,756,274 | 9/1973 | Wofgramm | 137/271 X |
| 3,843,168 | 10/1974 | Morrill et al. | 285/24 |
| 3,866,677 | 2/1975 | Baugh | 166/0.6 |
| 3,918,485 | 11/1975 | Weber et al. | 137/594 |
| 3,930,656 | 1/1976 | Jelinek | 285/363 X |
| 4,019,334 | 4/1977 | Sinclair et al. | |
| 4,296,777 | 10/1981 | Rodemer | 137/351 |

FOREIGN PATENT DOCUMENTS

| | | |
|---|---|---|
| 1275609 | 10/1961 | France ............................ 277/2 |
| 2323863 | 4/1977 | France . |
| 1051747 | 12/1966 | United Kingdom . |
| 1116289 | 6/1968 | United Kingdom . |
| 1388128 | 3/1975 | United Kingdom . |
| 1389010 | 4/1975 | United Kingdom . |
| 2022725 | 12/1979 | United Kingdom . |
| 2036199 | 6/1980 | United Kingdom . |

OTHER PUBLICATIONS

Offshore Services Magazine, Jan. 1978, pp. 26–51, published by Spearhead Publications Limited.

Primary Examiner—Thomas F. Callaghan
Attorney, Agent, or Firm—Ned L. Conley; David A. Rose; William E. Shull

[57] ABSTRACT

A flangeless, disc-like seal plate is disclosed for insertion between opposing flowline hubs for sealingly connecting, blocking or rerouting fluid flow between various fluid carrying lines within said flowline hubs. For connecting flow lines, straight throughbores within the seal plate are provided with V-seals in channels on said seal plate around the throughbores, as well as O-ring seals around said V-seals and another O-ring near the periphery of the disc itself. No seals or seal grooves are necessary on the hub faces. For connecting hydraulic control lines, the seal plate is equipped with transverse channels interconnecting various throughbores but may also be provided with blind ports for totally blocking off certain control lines at the plate. Within said throughbores, fluid diverter plugs are inserted which are either equipped with protruding caps for opening up corresponding check valves housed within hub lines or flush plugs such that said check valves remain closed after clamp-up. Through this arrangement various lines may either be blocked, be fluidly connected, or have their fluid flow rerouted internally without rearranging the alignment between the lines within the flowline bundle.

22 Claims, 17 Drawing Figures

FLOWLINE CONNECTOR SEAL

REFERENCE TO RELATED APPLICATIONS

This application is a continuation of U.S. application Ser. No. 087,747, filed Oct. 24, 1979, and now abandoned, which was a continuation-in-part of U.S. application Ser. No. 973,895, filed Dec. 28, 1978, which was abandoned in favor of U.S. application Ser. No. 283,094, filed July 13, 1981, now U.S. Pat. No. 4,382,717.

TECHNICAL FIELD

This invention relates to flowline and hydraulic control line connections wherein two or more such lines must be sealingly connected with one another. More particularly, it relates to underwater connectors for connecting flowline and hydraulic control lines, sealing the connection, testing the connection and rerouting the fluid flow within the connection.

BACKGROUND ART

Originally offshore oil and gas wells were completed on platforms resting on the ocean bottom, or were completed on the bottom with surface production facilities installed on such a platform. Oil and gas produced at such platforms were either collected by tankers or by flowlines laid on the bottom. To the extent that underwater work was required, it was performed by divers, by submarines, or by simple manipulations from the surface.

More recently it has become necessary to drill oil and gas wells in water which is too deep or too dangerous for convenient underwater operations by divers or for platforms standing on the bottom. It has thus become necessary to device methods of connecting subsea oil and gas wells at the ocean floor with flowlines, hydraulic control lines and electrical cables extending to the surface without the use of divers or any permanent surface structure adjacent the underwater well. Various devices have been proposed for achieving such underwater connections, as shown for example in U.S. Pat. Nos. 3,968,838 to Baugh, 4,019,334 to Sinclair, et al, and 4,086,778 to Latham, et al. A better understanding of the problems presented may be obtained by reference to the January 1978 issue of Offshore Services magazine, published by Spearhead Publications Limited, at pages 26-51.

In connecting, by remote operation, flowlines and hydraulic lines to an underwater production unit, it is essential to insure that the connection is properly sealed. One or more of the hubs or ends of the lines may become damaged during their descent to the ocean bottom, travel along the ocean floor, and pulling onto the production unit for connection thereto. Such damage may prevent sealing engagement with the hub on the production unit.

In the past clamp connectors for underwater flowline assemblies, such as the one disclosed in applicants' own prior patent, U.S. Pat. No. 3,843,168 to Morrill, et al, have not used seal plates between the hubs but merely clamped the hub faces together to achieve fluidtight engagement. Hence, the hub alignment is critical prior to clamping and sometimes the connection could not be tested hydraulically before full flow conditions are established. Other connections include elongated spool pieces, such as the one disclosed in U.S. Pat. No. 4,019,334 to Sinclair, et al, which require two clamps or sets of bolted flanges, one at each end of the spool piece, to establish a fluidtight connection.

Prior art connections require direct end-to-end alignment between mating flowline and hydraulic control line ends and do not permit fluid interconnection between one line and any other line not directly aligned with each other without physically rearranging or realigning the lines within the connection.

The present invention overcomes the deficiencies of the prior art by providing a seal plate between the ends of lines in the connection. The seal plate eliminates critical hub alignment, provides improved sealing, permits testing of the connection and allows rerouting of flow between the various lines. Other objects and advantages of the present invention will appear from the following description.

DISCLOSURE OF THE INVENTION

The seal plate of the present invention includes a metal body member, ears integral with the body member, flowline flow ports and hydraulic line bores through the body member, seals mounted around the ports and bores, transverse passages between certain hydraulic line bores, throughbores for alignment pins and test passages within the body member. The metal body member is a few inches thick and has a shape generally conforming to the shapes of the flowline hubs. The diameter of the body member is preferably on the order of 6 to 7 times larger than the thickness of the body member. The throughbores receive alignment pins engaging the flowline hubs for matingly engaging and aligning the flowlines, hydraulic lines, the flowline flow ports, and hydraulic line bores. The test passages within the metal body member terminate in fluid test ports through which a pressure test of the seals may be carried out after the connection is made. The hydraulic line bores through the body member are adapted to receive stop plugs or protruding center pins with means for fluid flow around them to permit fluid flow through said hydraulic line bores. The hydraulic lines terminating within the hubs are sealed off at the hub face through check valves mounted within the apertures in the hubs for each hydraulic line. When the connection is made, the protruding center pin within the hydraulic line bore of the seal plate will push open the check valve within the hydraulic line aperture of the hub. If a flush stop plug rather than a protruding pin is mounted within a hydraulic line bore of the seal plate, the corresponding hydraulic line will not be opened but remain blocked off from fluid flow.

The seals, carried by the seal plate of the present invention, include metal V-seals around each flowline port and control line bore, conventional O-rings around the metal V-seals surrounding the flowline ports, and conventional O-rings around the periphery of the seal plate. The seal plate is also equipped with hydraulic test ports inside the peripheral O-ring to test the seals after clamp-up. No seals or seal grooves are required on the flowline hubs.

The seal plate may be changed to block selected hydraulic lines within the connection. In addition, internal transverse channels are cut within the seal plate itself permitting fluid communication between certain hydraulic control lines. These transverse channels within the seal plate may be employed to reroute fluid flow between various lines and even reverse the flow altogether within the seal plate.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENTS

Figure 1:
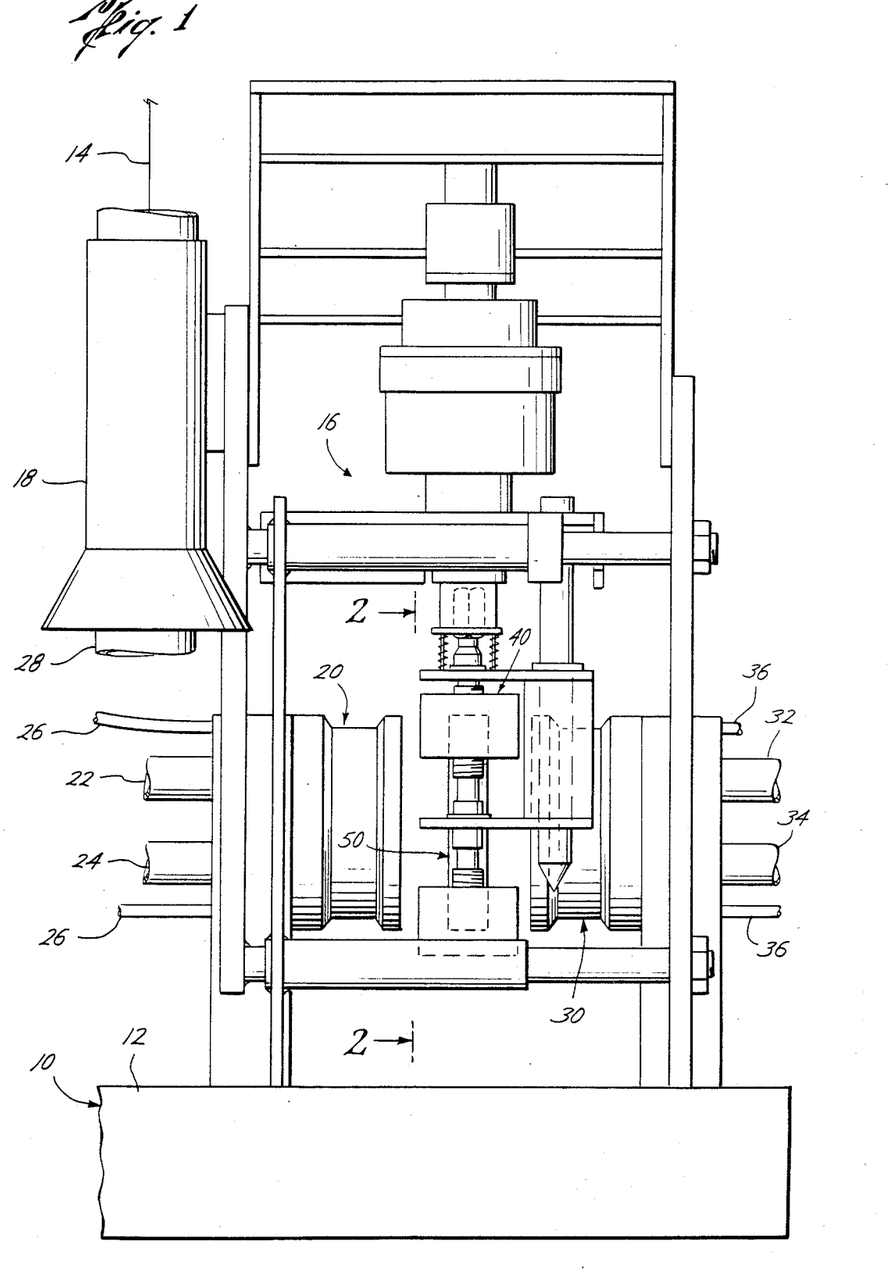
FIG. 1 is a schematic view showing the environment of the invention including a connecting tool for remotely connecting the mating faces of subsea flowline and hydraulic line hubs.

Referring first to FIG. 1, there is illustrated an environment of the present invention for connecting underwater flowlines and hydraulic lines to flowlines and hydraulic lines extending to the surface. Details of the environment are described in patent application Ser. Nos. 973,619 filed Dec. 27, 1978 now U.S. Pat. No. 4,329,085 and 973,895; filed Dec. 28, 1978, abandoned in favor of application Ser. No. 283,094, filed July 13, 1981, now U.S. Pat. No. 4,382,717, which are incorporated herein by reference. A portion of an underwater manifold center, shown as production unit 10, gathers oil and gas produced from one or more wells and transfers the produced oil and gas to a central location. Production unit 10, as shown in FIG. 1, includes a Christmas tree (not shown) that has been landed on the base 12 having been guided into position. One or more flowlines, such as flowlines 22, 24 for transporting the oil or gas, and hydraulic control lines 26 terminate at an inboard hub 20 mounted on production unit 10. When it becomes desirable to transport the oil and gas from production unit 10 to the surface, it becomes necessary to lay underwater pipelines or flowlines extending to the surface and to connect such flowlines and hydraulic control lines to inboard hub 20. The present invention includes apparatus useful in achieving this underwater connection.

As disclosed in U.S. Pat. Nos. 4,329,085 and 4,382,717, a floating vessel has drill pipe (not shown) and various guidelines 14 extending downwardly therefrom to underwater production unit 10. A pipe laying barge, such as is well known in the art, is used to lay underwater pipelines or flowlines for oil and gas. The barge has depending therefrom an outboard hub 30 connected to flowlines 32, 34 and one or more hydraulic control lines 36 for mating connection to inboard hub 20 with inboard flowlines 22, 24 and hydraulic control lines 26. To achieve the mating connection between inboard hub 20 and outboard hub 30, the floating vessel has a pull-in tool (not shown) which is lowered onto production unit 10 to pull, by means of a cable, a flowline bundle housing outboard hub 30 from the pipe laying barge to production unit 10. Upon proper alignment of hub 30 and the securement of said flowline bundle on production unit 10, the pull-in tool is retrieved.

Referring again to FIG. 1, a hub connector tool, generally indicated at 16, carrying a clamp 40 and seal plate 50 is lowered from the vessel along guide cable 14 and landed on base 12. Tool 16 is guided onto the base 12 by funnel 18 engaging base structure guide posts 28 and tool hub yokes engaging inboard and outboard hubs. Inboard hub 20, even though mounted on base 12, is horizontally slideable, such movement being permitted by the flexibility of flowlines 22, 24 and hydraulic control lines 26.

The underwater flowline and hydraulic control line connection of the present invention connects hubs 20 and 30 to achieve fluid communication between flowlines 22, 24 and hydraulic control lines 26 with flowlines 32, 34 and hydraulic control lines 36 respectively. The connection is accomplished using clamp 40 to clamp seal plate 50 between hubs 20 and 30 with guidance plugs 150 (shown in FIG. 6) and check valves 110 (shown in FIG. 11) housed therewithin.

The means for making the connection may be of the type shown in U.S. Pat. No. 3,843,168 issued Oct. 22, 1974, entitled "Clamp Connectors". Such a connector means is illustrated in part in FIGS. 2, 3, and 4 and includes a pair of plates 42, 44 supporting an upper and lower clamp half 46, 48 with seal plate 50 being suspended by plate 44 between clamp halves 46, 48. Clamp halves, 46, 48 are threadingly disposed between plates 42, 44 on screws 52, 54 whereby as screws 52, 54 are energized, clamp halves 46, 48 close around seal plate 50 and hubs 20, 30.

It can be appreciated that the seal plate and related connection may be used for connecting flowlines, hydraulic control lines, electrical connections, other types of control lines, and combinations thereof. Although seal plate 50 is shown adapted to connect hubs 20 and 30 having both flowlines and hydraulic control lines, a seal plate for connecting only hydraulic control lines will be described later.

Referring now to FIGS. 2, 5, 6 and 7, seal plate 50 used with hubs 20, 30 includes a flangeless disc-like body member 56, approximately 2½ inches thick and made of steel, having a generally circular shape conforming to hubs 20, 30. Body member 56 has a diameter of approximately 18 inches and has two diametrically opposed holding ears 58, 60 having rectangular slots 62 for receiving the edges of plate 44 to mount seal plate 50 on the connector tool 16.

Figure 2:
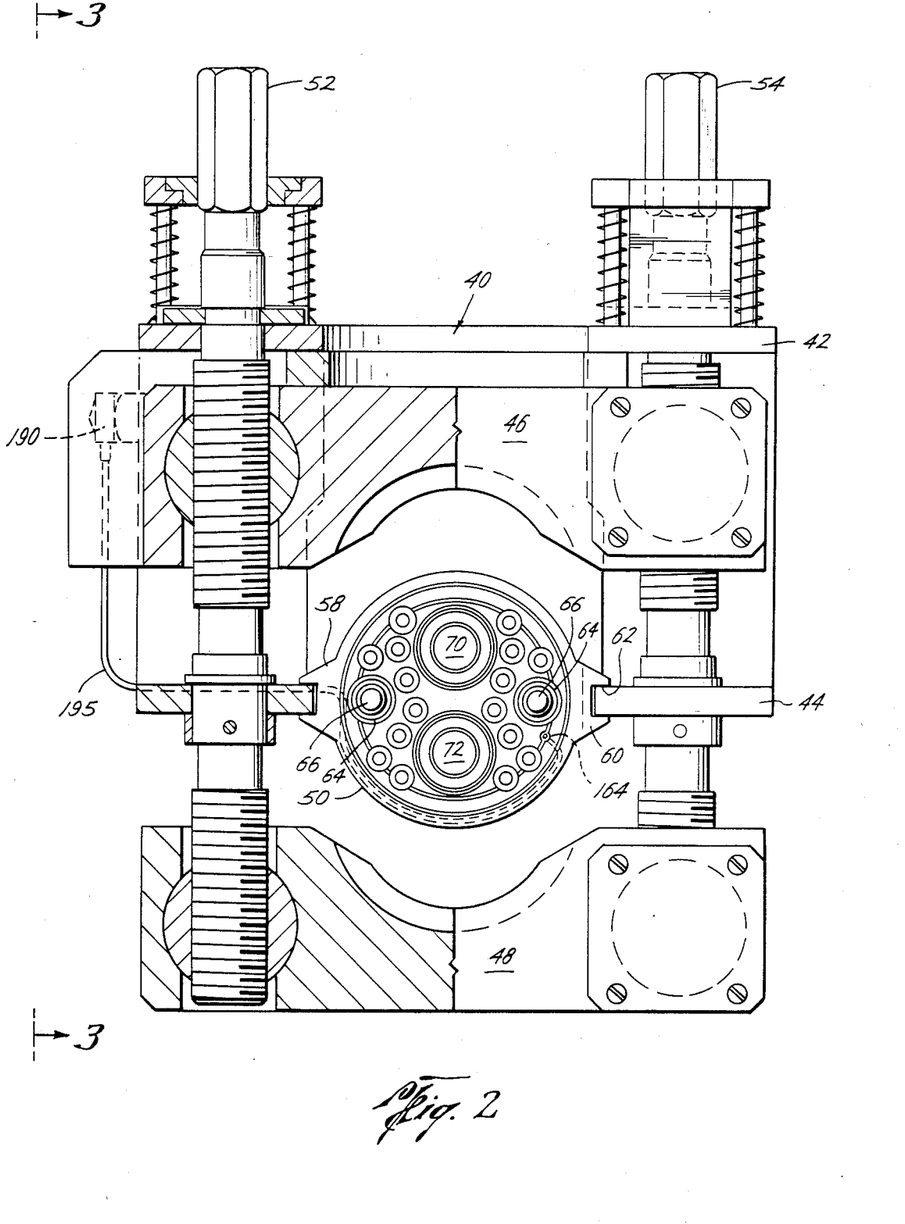
FIG. 2 is an elevation view, partly in section, of the clamp connector with the seal plate mounted between the clamp halves.
Figure 4:
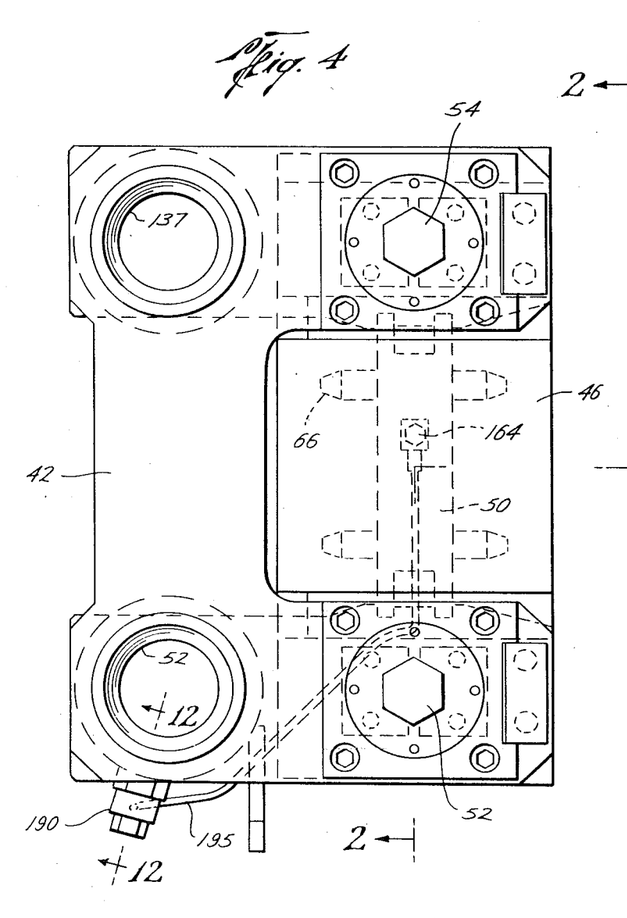
FIG. 4 is a top view of the clamp connector and seal plate of FIG. 2.
Figure 8:
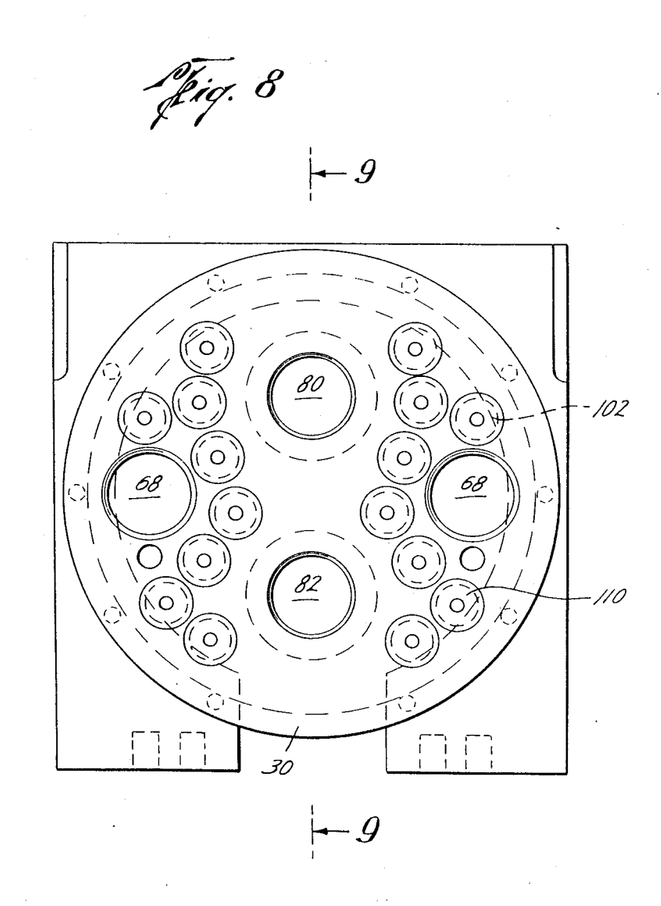
FIG. 8 is a front view of a flowline hub with flowline flow ports and hydraulic line bores.
Figure 9:
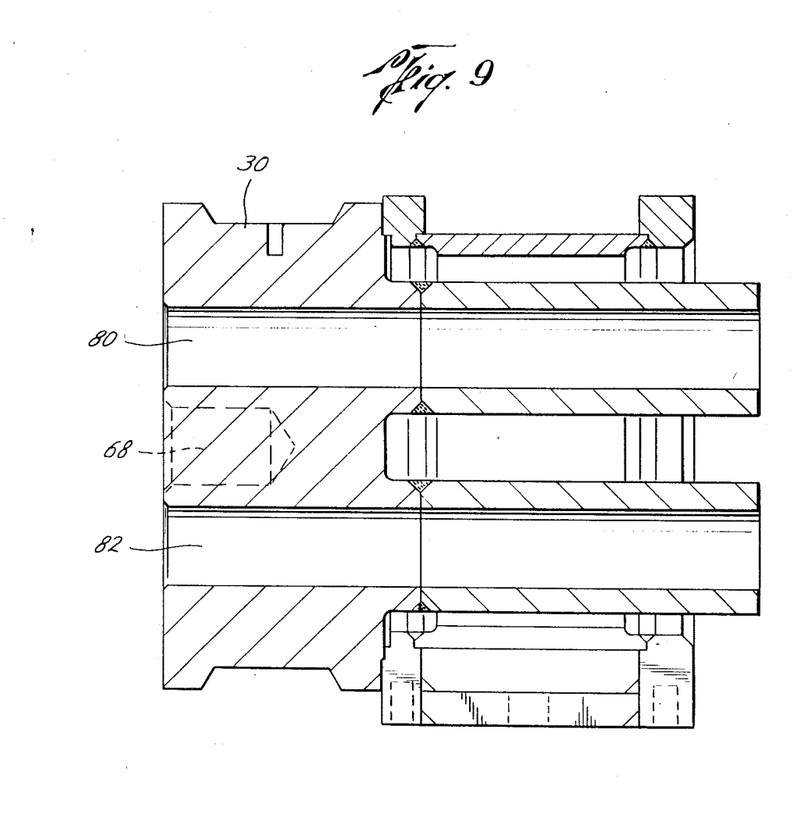
FIG. 9 is a side section view of the flowline hub of FIG. 8.

Two holes 64 through body member 56 are located adjacent holding ears 58, 60 to receive two dowel pins 66 (shown in FIGS. 2 and 4). Dowel pins 66 fit tightly within holes 64 to secure them to seal plate 50. Hubs 20, 30 have apertures 68 to receive pins 66 upon final connection. Aperture 68 of hub 30 is shown in FIGS. 8 and 9. Dowel pins 66 provide a final alignment of hubs 20, 30 and seal plate 50 prior to clamping them together.

Figure 5:
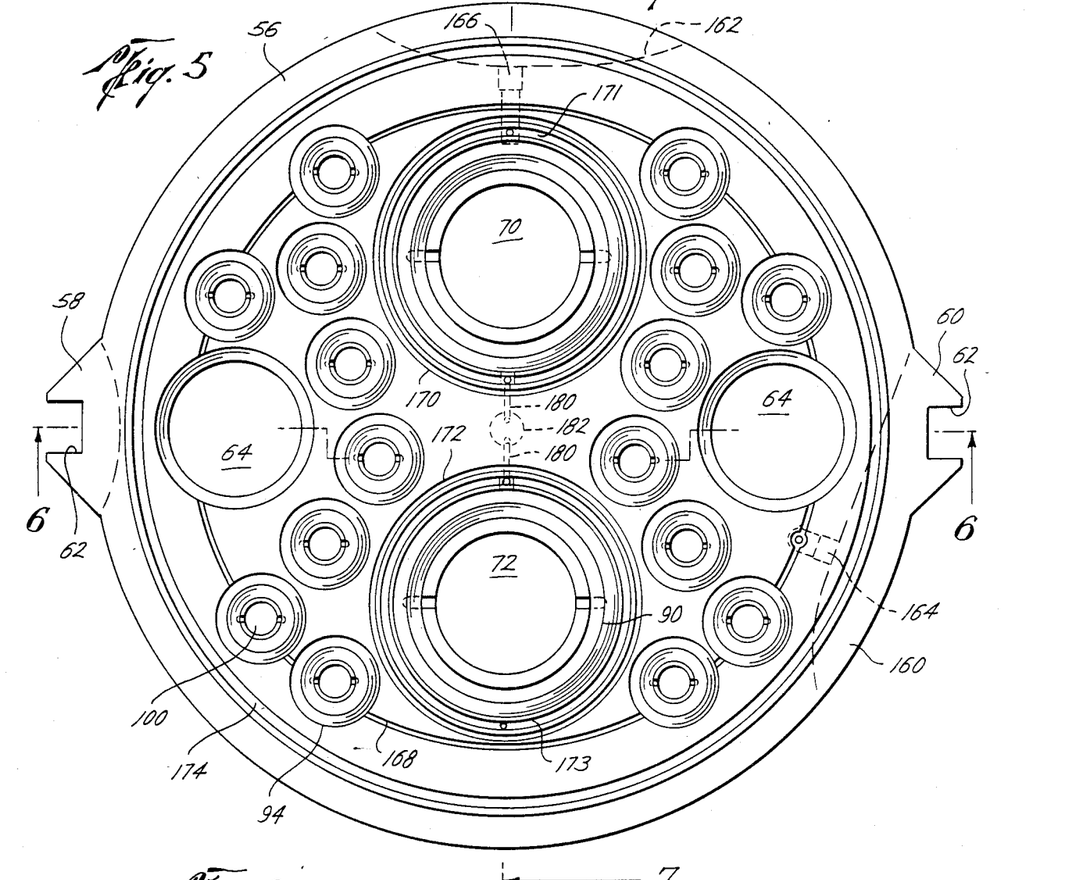
FIG. 5 is an elevation view of a flowline seal plate for both flowlines and hydraulic lines.
Figure 7:
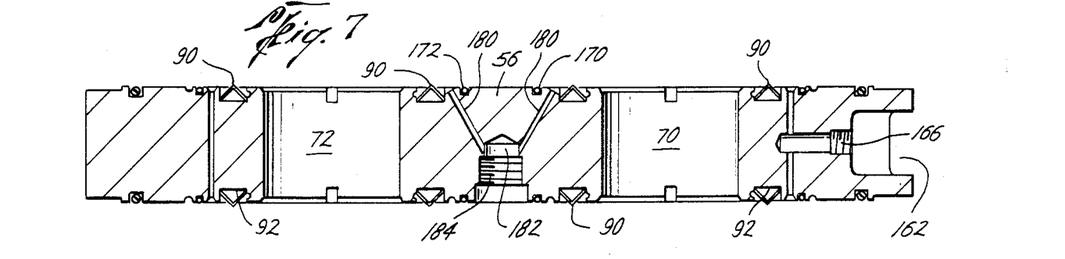

Referring to FIGS. 5 and 7, body member 56 of seal plate 50 further includes two flowline ports 70, 72 adapted for alignment with flowline passageways 80, 82 as illustrated in FIG. 9 in hubs 20, 30 connected to flowlines 22, 24 and 32, 34 respectively. As shown in FIG. 7, the flowline ports 70, 72 of seal plate 50 are encircled by metal V-seals 90 such as the ones disclosed in U.S. Pat. No. 3,637,223 to Weber, which are housed in annular grooves 92 on each face of seal plate 50. V-seals 90 contact the face of hubs 20, 30 upon make up of the connection to provide a sealing connection around the flowline ports 70, 72 and passageways 80, 82. O-rings 170 and 172 are housed in annular grooves in both faces of seal plate 50 to provide a test seal around flowline ports 70, 72 respectively.

Figure 6:
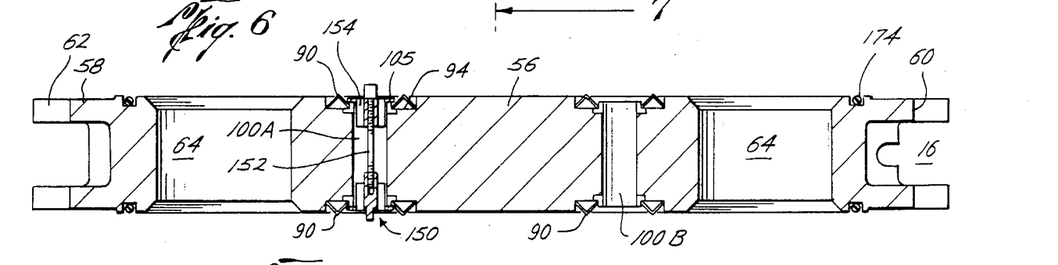
FIGS. 6 and 7 are cross-sectional views of the seal plate of FIG. 5, taken along lines 6—6 and 7—7, respectively.
Figure 10:
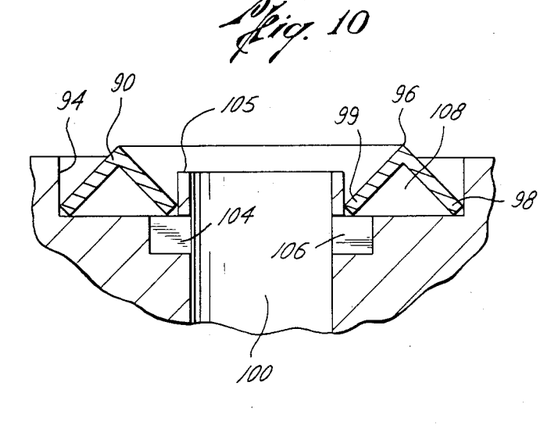
FIG. 10 is a sectional view of a metal V-seal ring surrounding one of the flowline flow ports or hydraulic line bores.

Referring now to FIGS. 5 and 6, body member 56 also includes sixteen hydraulic control line bores 100 positioned for alignment with hydraulic control line orifices 102 (shown in phantom lines in FIG. 8) in hubs 20, 30 communicating with hydraulic control lines 26 and 36 respectively. As shown in FIGS. 6 and 10, metal V-seals 90 also surround hydraulic control line bores 100 in annular grooves 94 located in each face of seal plate 50 and contact the faces of hubs 20, 30 upon make up for sealing around bores 100 and orifices 102 (shown in FIG. 8).

As shown in FIG. 5, O-rings 174 are housed in annular grooves around the periphery of both faces of seal plate 50 around all of the flowline ports 70, 72 and hydraulic control line bores 100 for testing purposes. Thus all seals are carried by seal plate 50 permitting hubs 20, 30 to be free of any seals or seal grooves on their faces.

Referring now to FIG. 10 for a discussion of the V-seals 90, the V-seals 90 on both sides of the seal plate 50 have their apex 96 extending away from the face of the seal plate 50 such that, when clamped together, their legs 98, 99 are slightly depressed forming a fluidtight seal between the faces of plate 50 and hubs 20, 30. Each hydraulic control line bore 100 is provided with two diametrically opposed channels 104, 106 extending from the perimeter of bores 100 into V-seal groove 94. The function of channels 104, 106 is best illustrated with reference to FIG. 10. In the absence of channels 104, 106 fluid pressure from within bore 100 might conceivably establish sealing contacts, pressure transfer and deformation along leg 99 of V-seal 90. Channels 104, 106, however, permit fluid flow underneath leg 99 and into the triangular center portion 108 of V-seal 90 thereby equalizing the pressure on both sides of inner leg 99 of V-seal 90. Thus, the desired pressure seal is established along the outer leg 98 of V-seal 90.

Figure 11:
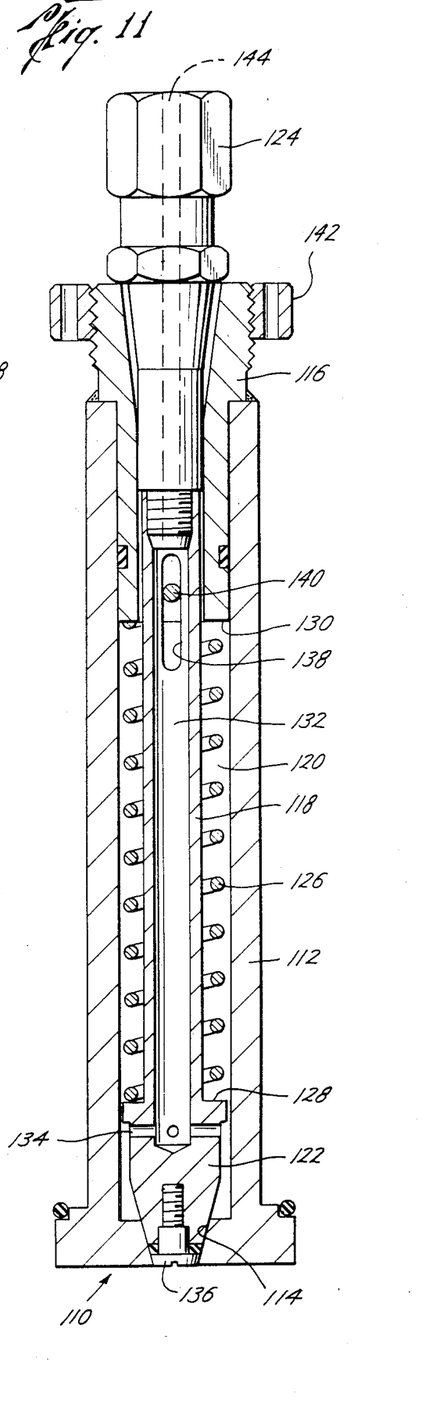
FIG. 11 is a sectional view of one of the check valves disposed within the hydraulic control lines.

Referring now to FIGS. 8 and 11, check valves 110 are disposed in each of the hydraulic control line orifices 102 to control fluid flow therethrough. As shown in FIG. 11, valve 110 includes a tubular housing 112 having a valve seat 114 in one end and a closure ring 116 in the other. A tubular valve rod 118 is disposed within the chamber 120 of housing 112 and has a tapered head 122 adjacent valve seat 114. A connection 124 on the other end of rod 118 protrudes outside of housing 112 having a center channel 144 for fluid communication between chamber 120 and hydraulic control line orifice 102. A spring 126 is biased between an annular shoulder 128 created by head 122 and the internal end 130 of closure ring 116. Valve rod 118 has an internal chamber 132 and ports 134 to permit fluid to flow into chamber 132. Head 122 has a contact pin 136 threaded into its outer end. Valve rod 118 includes a slot 138 which slideably receives a stop pin 140 protruding from the inner wall of housing 112 and into chamber 120. Pin 140 limits the travel of valve rod 118 within chamber 120. Closure ring 116 has an annular ring 142 to be bolted against an internal shoulder (not shown) within the hydraulic control line orifice 102.

Referring again to FIG. 6, each hydraulic control line bore 100 may function to provide a throughbore for fluid flow, block fluid flow, or permit a pressure tap into the bore. Where a throughbore such as bore 100A shown in FIG. 6 is used to provide for a straight connection between the mating hydraulic control lines 26, 36 of hubs 20, 30, a fluid guidance plug 150 is disposed within the hydraulic control line bore. Fluid guidance plug 150 consists of center pin 152 protruding beyond the faces of seal plate 50 when fully inserted in bore 100A and fins 154 extending across that same bore opening 100A which abut a raised shoulder 105 within grooves 94. Fluid guidance plugs 150 are either flush with, or extend beyond, the faces of seal plate 50.

Referring to FIG. 8, hydraulic control line orifices 102 within hubs 20, 30 are all equipped with check valves 110 which seal off the hydraulic control lines 26, 36 unless the check valve 110 is depressed and opened by one of the fluid guidance plugs 150. Alternatively, if a guidance plug 150 has been chosen which is flush with the surface of plate 50, the check valve 110 inside the control line of the hub will remain closed even after seal plate 50 and hubs 20, 30 are clamped together. In operation upon engagement with seal plate 50 and the application of clamp 40, the protruding end of the hydraulic line fluid guidance pin 150 within the seal plate throughbore 100 engages head 122 and depresses spring 126 permitting fluid communication between the seal plate valve seat 114 and exit connection 124 from internal channel 132. Stop pin 140 provides a safety stop for restricting the maximum travel of check valve rod 118 under depression of spring 126.

Referring again to FIGS. 5-7, seal plate 50 has several means for remote sensing and testing of the hydraulic line V-seals 90 for leakage. A generally rectangular channel 160 adjacent holding ear 60 is cut along the perimeter of seal plate 50 and a second channel 162 at the top of seal plate 50 is also cut along the perimeter. Hydraulic test lines such as those shown in phantom lines in FIG. 2 are laid within these channels 160, 162, respectively, which are connected to pressure reservoirs (not shown) at one end and to test ports 164, 166 adjacent channels 160, 162 respectively, at the seal plate end thereof. Test port 164 is located between O-rings 174 and 170, 172. The V-seal grooves 94 of throughbores 100, as well as pin throughbores 64, are connected by means of a semicircular groove 168. Test port 164 is situated within semicircular groove 168 along which the test fluid is distributed throughout the surface of seal plate 50. Test port 166 is positioned inside O-ring 170 and terminates within semicircular groove 171. A similar groove 173 around flowline 72 is connected to test port groove 171 by means of connector bores 180 terminating in center bore 182 which in turn is sealed off against liquid loss by plug 184 (shown in FIG. 7). Through this arrangement, a static test pressure may be applied through test port 166 inside both flowline O-rings 170 and 172 which may thus be tested against leakage separate and apart from static pressure tests applied to O-ring 174 through test port 164.

Figure 3:
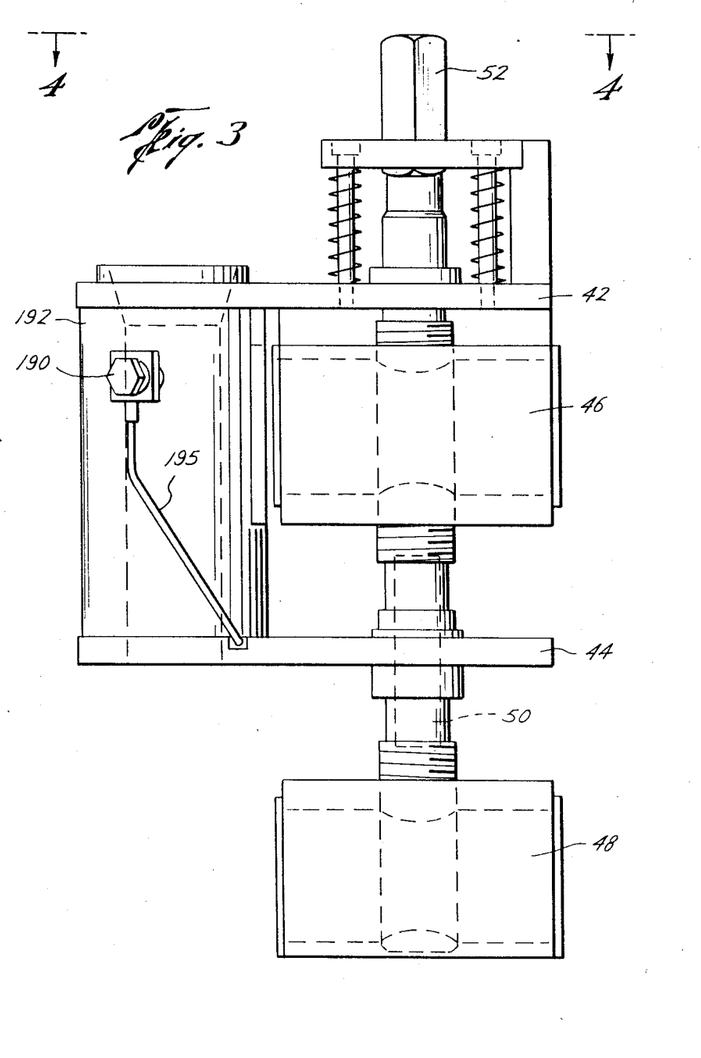
FIG. 3 is a side view of the clamp connector and seal plate of FIG. 2.
Figure 12:
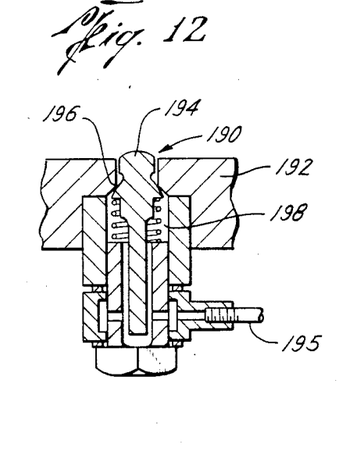
FIG. 12 is a sectional cut-away of one of the hydraulic fluid test valves used for testing the seal plate for leakage after clamping engagement.

Referring now to FIGS. 2, 3, and 4, seal plate 50 is depicted as being suspended between the clamp halves 46, 48 by plate 44 on ears 58, 60. A test port valve 190 is carried in guide pin receiving sleeves 192 which are attached between plates 42, 44, e.g., by welding. Test port valves 190, as illustrated in FIG. 12, are closed by a spring loaded stop 194 biased against shoulder 196 until the guide pin (not shown) on the connector tool 16 receiving structure of the subsea assembly depresses spring 198 and opens fluid communications between the hydraulic test fluid reservoir (not shown) and test line 195.

Figure 13:
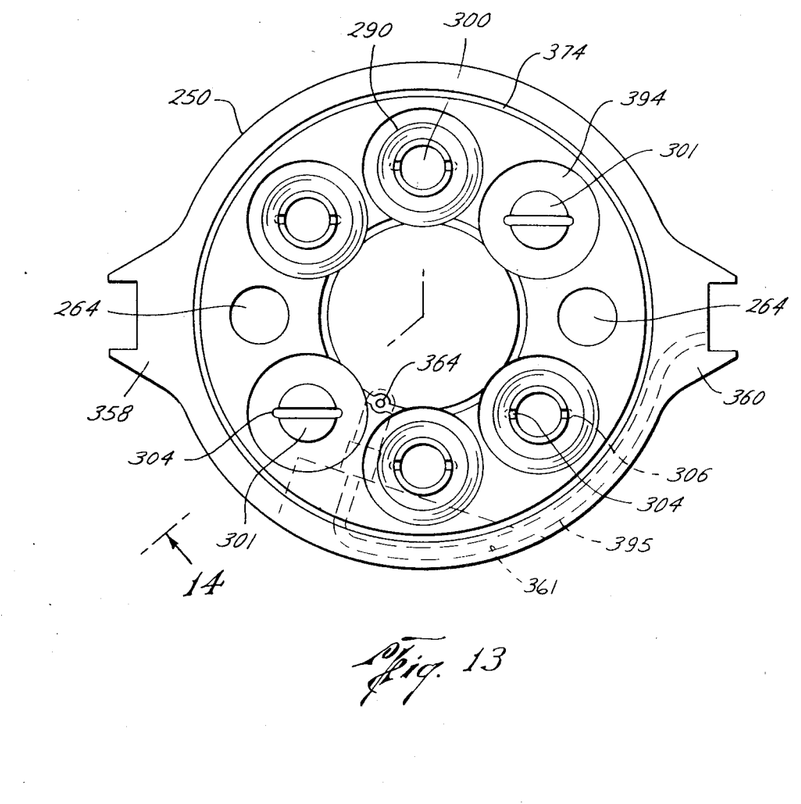
FIG. 13 is an elevation view of a seal plate for hydraulic lines only.
Figure 14:
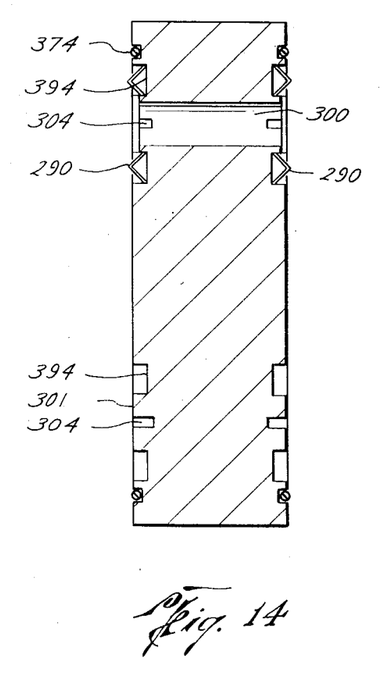
FIG. 14 is a cross-sectional view of the seal plate of FIG. 13, taken at line 14—14 of FIG. 13.

Referring now to FIGS. 13 and 14, a seal plate 250 is shown for connecting hubs containing only hydraulic control line bores 300. In the proximity of holding ears 358, 360, but inside O-ring 374, are located two dowel holes 264. Hydraulic bores 300 through seal plate 250 may function either as direct fluid communication channels between the control line ends, or as means to provide a pressure tap in any given line, or, lastly, as interconnected bores to reroute fluid flow in any desired fashion.

Figure 15:
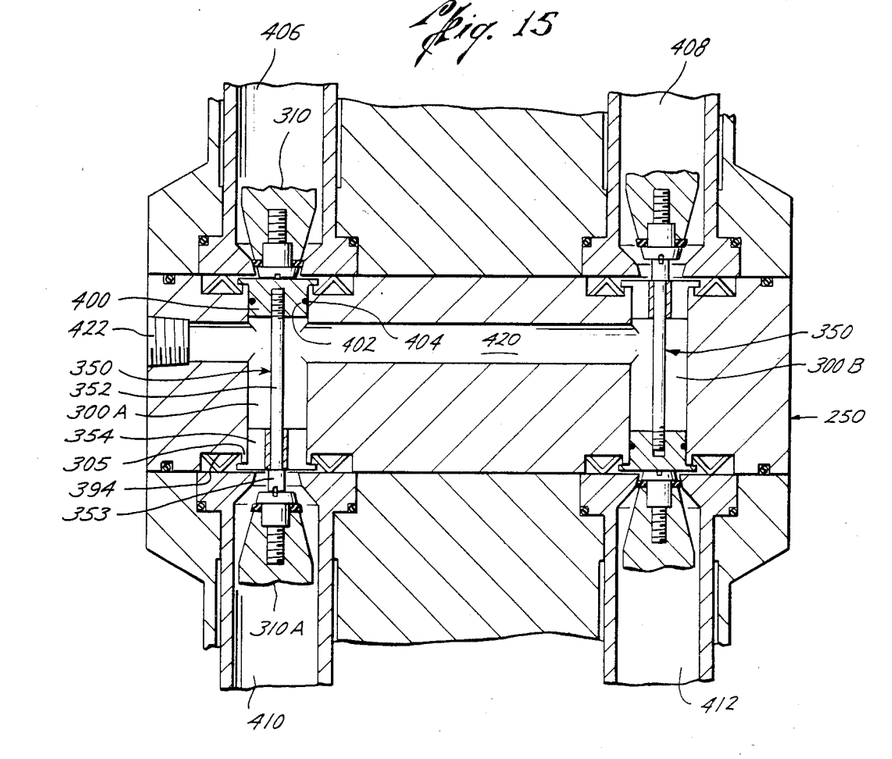
FIG. 15 is a sectional view of the seal plate of FIG. 13 with two hydraulic line hubs having fluid diverter plugs.

Referring now to FIG. 15, fluid guidance plugs 350 are positioned within hydraulic line bores 300A and 300B. Such fluid guidance plugs consist of center pin 352 having one end 353 protruding beyond the surface of seal plate 250 when fully inserted in bore 300A, fins 354 extending across that same bore opening 300A which abut a raised shoulder 305 within channel 394 and a circular stop plug 400 sealing off bore opening 300A at the other end of the pin 352. Stop plug 400 in turn is sealed around its periphery against fluid escaping along the walls of channel 300A by an O-ring 402 positioned within annular groove 404.

As shown in FIG. 15, hydraulic lines 406, 408, 410 and 412 within the hubs are equipped with check valves 310 which seal off hydraulic control lines 406, 408, 410 and 412 against loss of hydraulic fluid when not connected to seal plate 250. As the clamp halves pull the hubs toward each other the protruding end of stop pin 352 pushes open check valve 310A, thereby enabling hydraulic fluid to pass between fins 354 and to enter bore 300. Within seal plate 250 a number of transverse bores, e.g., 420, connect the various bores 300. Such transverse bores drilled inside seal plate 250 are sealed at the periphery by tapered plugs, such as 422. By positioning another stop plug 400 of the type just described above in bore 300B connected to bore 300A by transverse bore 420, fluid communication between the two bores may be arranged in two different ways. Positioning stop plug 400 in the manner shown in FIG. 15, i.e., such that protruding pins 353 in bores 300A and 300B extend away from that side of seal plate 250 which abuts hydraulic line 410, 408, respectively, the check valves 310 within the hydraulic lines will be pushed open so as to connect lines 408 and 410 in the fashion indicated in FIG. 15.

By reversing stop plug 400 in bore 300B, however, its sealed off end will close off line 408 from line 410 and the protruding end 353 of pin 352 will, in that position, open up the check valve 310 within flowline 412, thus effectively reversing the fluid flow at the seal plate by rerouting all liquid coming in from line 410 to return through 412.

Figure 16:
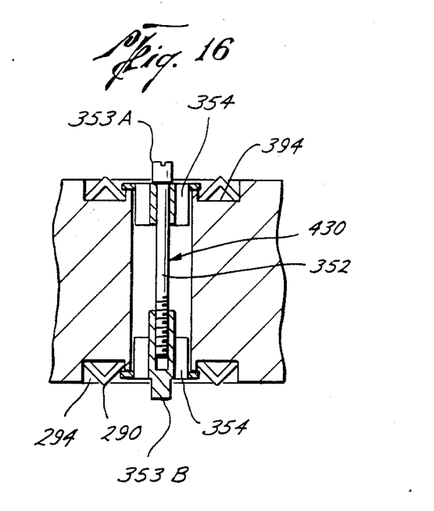
FIGS. 16 and 17 are partial sectional views of different fluid guidance plugs of the type shown in FIG. 15.
Figure 17:
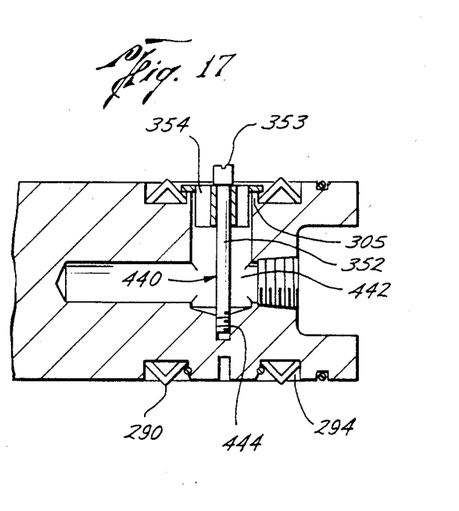

Two other variations of the fluid guidance plugs 350 shown in FIG. 15 are contemplated within the seal plates of the present invention and are shown in FIGS. 16 and 17. Through-line plug 430 in FIG. 16 has both ends of center pin assembly 352 protruding beyond the face of seal plate 250. It is also provided with fin connectors 354, similar to the ones described above, at both ends of the fluid bore, e.g., bore 300. When employed between two hydraulic fluid line hubs, each sealed off by check valves 310 as described above, the protruding ends 353A and 353B of pin 352 will open both check valves 310 and the fins 354 will permit straight-line fluid connections through seal plate 250.

Instead of sealing off one end of a real throughbore such as bores 300, a valve opening or fluid guidance plug 440 may also be employed in another type of seal plate port, such as channel 442 in FIG. 17 which does not extend all the way through seal plate 250, but does provide interconnection with other fluid bores through internal channels within seal plate 250. In that embodiment, one end of protruding pin 352 is pressed against a center bore 444 within the fluid channel 442. Connector fins 354 abutting shoulders 305 permit fluid flow from the check valve 310 within the hydraulic line of the hub, once opened by protruding end 353 of pin 352, to enter channel 442 which does not extend straight through seal plate 250, but is connected to other flow ports of seal plate 250 via internal seal plate channels (not shown in the sectional plane of FIG. 17) which terminate at semibore 442.

Lastly, hydraulic control lines may also be sealed off completely by not providing a throughbore at their seal plate terminus. Of the six hydraulic line seal ports of seal plate 250, for example, ports 301 are blind ports, as shown in FIGS. 13 and 14. The may be used, for example, to put a pressure tap in the corresponding hydraulic line. As shown in more detail in FIG. 13, the hydraulic lines ending at blind ports 301 of seal plate 250 about V-seal channels 394, and, their internal check valves 310 not being opened by a corresponding pin 352, remain effectively sealed against any fluid loss by both the internal check valves 310 and the V-seals 290 of blind ports 301 on the seal plate itself. Once again, an outer O-ring 374 and a test port 364 within semicircular test groove 133 permit the application of a test pressure on each surface of seal plate 250 to check the clamp application and the O-ring seal 374 for fluid tightness. As described above, all V-seal channels 394 in both blind and fluid communicable ports are equipped with pressure equalization grooves 304, 306. Test port hydraulic connection line 395 is again run in along a channel 361 cut within the perimeter of the disk and extending through one of the holding ears 360 to clamp half 46. In this particular embodiment, only one test port 364, one test port line 395 and one test port valve 190 are needed in the absence of the two main flowlines.

The diverless tree connection system for subsea template production units within which the seal plate of the present invention is to be employed is characterized by the fact that no hydraulic equipment is left on the sea bottom to maintain the integrity of the joint and that all of the tools are retrieved for further use in other installations. This system recommends itself through its simplicity of design, the economics of its operation and the ease and speed of the connection and disconnection features. The diverless connection system is utilized where the wellhead or tree flowlines and the hydraulic control lines with protective covers on the exposed hubs, are already laid to the well site and the other flowline hub with its inferfacing flowlines and service lines lies, similarly protected by a frontal cover plate, correctly aligned in a position which still permits one of them slight lateral movement. On the surface, a connector tool is attached to the guide wires and is run down to a position above the interfacing hub members. The hub cover plates are pushed downward by the bottom half of the clamp so that it now straddles the connection underneath the two hubs with its mating half stationed directly above and already engaged with the clamping screws. During that process a guide pin on the connector tool opens up the test port valve by depressing its spring loaded valve stop. The hydraulic rams between the hub yokes are then actuated and the flowline hubs drawn into the mating engagement. The clamping motors are energized and the two screws close the two halves until a predetermined clamping load is reached and the connection is made. During that process the metal V-seals surrounding all flowline and throughbore ports are depressed so as to be sealingly seated against the hub faces. At the same time the protruding pins of the fluid guidance plugs housed within the seal plate throughbores open up the check valves positioned within the hydraulic control line ends inside the hubs. The O-ring seals may now be tested for pressure loss and if there are no leaks the connector tool is run back to the surface, leaving the joint made up and no equipment on the seabed. Thereafter fluid flow through the flow lines or through the hydraulic control lines may be started up and normal operations begin.

Seal plates can be disengaged again and exchanged for differently configured plates by lowering the clamp connector tool and reversing the clamp locking steps previously described. In this fahsion fluid flow among various hydraulic lines may be rerouted by inserting seal plates having different internal channels and different guidance plug configurations.

Various other embodiments and modifications will also be apparent from the foregoing description. The invention is therefore not limited to the specific embodiments disclosed, but extends to every embodiment within the scope of the appended claims.

What is claimed is:

1. A seal plate for sealingly engaging two opposing fluid line hubs each having a plurality of flow bores therethrough, said flow bores each being connected to a separate fluid line, comprising:
    a disc-like metal body member having flangeless faces and a diameter larger than its thickness, and an arcuate channel in its periphery;
    a plurality of fluid throughbores extending through said body member, each said throughbore being connected to a separate flow bore in each hub for providing fluid communication between the fluid lines of the two opposing hubs;
    alignment means on said body member for aligning said fluid throughbores with the flow bores of the opposing fluid line hubs;
    metal seals disposed in each face of said metal body member and circumscribing each of said fluid throughbores for forming metal-to-metal seals between the opposing fluid lines hubs and said metal body member;
    test grooves disposed in each face of said metal body member and circumscribing each of said metal seals;
    annular seals disposed in each face of said metal body member and circumscribing each of said test grooves for sealingly engaging the fluid line hubs and said metal body member; and
    test means in fluid communication with said test grooves for providing said test grooves with pressurized fluid to test said metal seals, including first communication passages connecting adjacent test grooves in each face of said body member, second communication passages through said body member connecting said adjacent test grooves in one face of said body member with said adjacent test grooves in the other face of said body member, and a first test port disposed in said arcuate channel and in fluid communication with said first and second communication passages to pass said pressurized fluid to all of said adjacent test grooves in each face of said body member.

2. The seal plate defined by claim 1 wherein said metal seals have a V-shaped cross section.

3. The seal plate defined in claim 2 wherein said body member includes annular grooves around each of said fluid throughbores for housing said metal V seals.

4. The seal plate defined by claim 1 further including means on said body member for suspending said seal plate between the opposing fluid line hubs.

5. The seal plate as defined by claim 1 wherein said annular seals include elastomeric seal rings.

6. The seal plate as defined by claim 1 and further including a hydraulic control line bore through said body member.

7. The seal plate as defined by claim 3 wherein said metal seals are annular rings and the legs of said V-shaped cross section engage the bottom of said annular grooves, and further including an annular raised shoulder disposed around the inner periphery of said annular grooves and circumscribing said fluid throughbore making line contact with the innermost leg of said V-shaped cross section of said metal annular seal rings.

8. A connection for sealingly connecting two fluid carrying pipes for transporting fluids therebetween comprising:
    two hubs aligned opposite one another and each said hub having at least one port in fluid communication with one of such fluid carrying pipes, said hubs having opposing flat grooveless faces perpendicular to the flow axis of said ports;
    a seal plate disposed between said opposing hubs, said seal plate having a disc-like body with a common thickness, said disc-like body having at least one integral throughbore for the passage of fluids therethrough aligned between said ports;
    at least one dowel pin disposed within dowel pin bores in said seal plate for aligning said seal plate and said hubs;
    annular metal V-shaped sealing members of a generally triangular cross-section housed in first annular grooves circumscribing said throughbores in each face of said disc-like body for sealingly engaging said flat grooveless faces and said disc-like body to seal around the fluid connection between said ports and said throughbores;

second annular grooves disposed in each face of said body and circumscribing said grooves housing said metal V-shaped sealing members;

O-rings housed in said second annular grooves;

test grooves disposed in each face of said body and circumscribing said metal V-shaped sealing members, said test grooves being circumscribed by said second annular grooves housing said O-rings;

test means including at least one test port in fluid communication with said test grooves for providing said test grooves with pressurized fluid to test said metal V-seals and O-rings; and means connected to said seal plate for joining together said opposing hubs with said seal plate therebetween and establishing metal-to-metal seals between said flat grooveless faces of said hubs and said disc-like body of said seal plate, said joining means including two clamp halves straddling said hubs, said seal plate being suspended between said clamp halves, and remotely operable means to pull together said clamp halves.

9. A seal plate for sealingly engaging two opposing hubs, the hubs having at least one flow bore and at least one hydraulic line bore therethrough, comprising:

a disc-like metal body member having flangeless faces and a diameter substantially larger than its thickness;

a flowline port through said body member for each of the flow bores of the opposing hubs for providing fluid communication therebetween;

first annular grooves disposed in each face of said body member and circumscribing the inlet and outlet of said flowline port;

first metal sealing members housed in said first annular grooves for sealingly engaging the hubs and said body member;

second annular grooves disposed in each face of said body member and circumscribing said first annular grooves;

first elastomeric sealing members housed in said second annular grooves for sealingly engaging the hubs and said body member;

a hydraulic control line bore through said body member for each of the hydraulic line bores in the hubs to provide fluid communication therebetween;

third annular grooves disposed in each face of said body member and circumscribing the inlet and outlet of said hydraulic control line bore;

second metal sealing members housed in said third annular grooves for sealingly engaging the hubs and said body member;

fourth annular grooves disposed at the periphery and in each face of said body member and circumscribing all of said flowline ports and hydraulic control line bores;

second elastomeric sealing members housed in said fourth annular grooves for sealingly engaging the hubs and said body member;

fifth annular grooves disposed in each face of said body member between said first and second grooves;

sixth annular grooves disposed in each face of said body member passing through the inlet and outlet of the outermost of said hydraulic control line bores and circumscribing any other of said hydraulic control line bores;

test means including a first test port communicating with said fifth annular grooves and a second test port communicating with said sixth annular grooves for transmitting pressurized test fluids to said fifth annular grooves for testing said first metal sealing members and said first elastomeric sealing members and to said sixth annular grooves to distribute said test fluids on the faces of said body member; and means for aligning said metal body member with said opposing hubs.

10. A seal plate for sealingly engaging two opposing hubs, the hubs having at least one flow bore and at least one hydraulic line bore therethrough, comprising:

a disc-like metal body member having flangeless faces and a diameter substantially larger than its thickness;

a flowline port through said body member for each of the flow bores of the opposing hubs for providing fluid communication therebetween;

first annular grooves disposed in each face of said body member and circumscribing the inlet and outlet of said flowline port;

first metal sealing members housed in said first annular grooves for sealingly engaging the hubs and said body member;

second annular grooves disposed in each face of said body member and circumscribing said first annular grooves;

third annular grooves disposed in each face of said body member and circumscribing said second annular grooves;

first elastomeric sealing members housed in said third annular grooves for sealingly engaging the hubs and said body member;

a first test port communicating with said second annular grooves for transmitting pressure fluids to said second annular grooves to test said first metal sealing members and said first elastomeric sealing members for leakage;

a hydraulic control line bore through said body member for each of the hydraulic line bores in the hubs to provide fluid communication therebetween;

fourth annular grooves disposed in each face of said body member and circumscribing the inlet and outlet of said hydraulic control line bore;

second metal sealing members housed in said fourth annular grooves for sealingly engaging the hubs and said body member;

at least two alignment bores extending through said body member;

fifth annular grooves disposed in each face of said body member passing through the inlet and outlet of the outermost of said hydraulic control line bores and circumscribing any other of said hydraulic control line bores;

a second test port communicating with said fifth annular grooves for transmitting test fluids to said fifth annular grooves to distribute said test fluids on the faces of said body member;

sixth annular grooves disposed at the periphery and in each face of said body member and circumscribing all of said flowline ports and hydraulic control line bores; and second elastomeric sealing members housed in said sixth annular grooves for sealingly engaging the hubs and said body member.

11. The seal plate as defined by claim 10 where the hubs have a plurality of flow bores and hydraulic line bores therethrough, and further including:

first communication passages connecting adjacent second annular grooves in each face of said body member;

second communication passages through said body member connecting said adjacent second annular grooves in one face of said body member with said second annular grooves in the other face of said body member; and said first test port being in flow communication with said first and second communication passages to pass pressure fluids to said second annular grooves.

12. The seal plate as defined by claim 10 where the hubs have a plurality of flow bores and hydraulic line bores therethrough, said further including first and second arcuate channels in the periphery of said body member; said first and second test ports being disposed in said first and second arcuate channels, respectively.

13. The seal plate as defined by claim 10 wherein said first and second metal sealing members include metal annular seal rings having a V-shaped cross section, the apex of said V-shape engaging the hubs and the legs of said V-shape engaging said body member;

a first set of diametrically opposed channels extending from the periphery of said first annular grooves to said flowline port for permitting fluid flow underneath said legs of said metal annular seal rings in said flowline port; and a second set of diametrically opposed channels extending from the periphery of said third annular grooves to said hydraulic control line bore for permitting fluid flow underneath said annular metal seal rings in said hydraulic control line bore.

14. The seal plate as defined by claim 10 wherein said second metal sealing members include metal annular seal rings having a V-shaped cross section with the legs of said V-shape engaging the bottom of said fourth annular grooves, and including an annular raised shoulder disposed around the inner periphery of said fourth annular grooves and circumscribing said hydraulic control line bore making line contact with the innermost leg of said metal annular seal ring.

15. A seal plate for sealingly engaging two opposing hubs having opposing flat grooveless faces and a plurality of hydraulic lines extending therethrough, comprising:

a disc-like metal body member having flangeless faces and a diameter substantially larger than its thickness;

a plurality of hydraulic line ports through said body member, one of said hydraulic line ports being in alignment with each of the hydraulic lines for providing fluid communication therebetween;

first annular grooves disposed in each face of said body member and circumscribing the inlet and outlet of said hydraulic line ports;

metal sealing members housed in said first annular grooves for sealingly engaging the hubs and said body member;

at least two alignment bores extending through said body member;

second annular grooves disposed in each face of said body member and passing through said first annular grooves adjacent to the outermost side of said metal sealing members;

third annular grooves disposed at the periphery and in each face of said body member and circumscribing all of said hydraulic line ports;

elastomeric sealing members housed in said third annular grooves for sealingly engaging the hubs and said body member; and a test port communicating with said second annular grooves for transmitting pressurized test fluids to said first annular grooves to test said metal sealing members.

16. The seal plate as defined by claim 15 and further including an arcuate channel in the periphery of said body member for housing a portion of said test port.

17. The seal plate as defined by claim 15 wherein said metal sealing members include metal annular seal rings having a V-shaped cross section, the apex of said V-shape engaging the hubs and the legs of said V-shape engaging said body member; and diametrically opposed channels extending from the periphery of one of said first annular grooves to one of said hydraulic line ports for permitting fluid flow underneath said annular metal seal rings from said hydraulic line port.

18. The seal plate as defined by claim 15 wherein said metal sealing members include metal annular seal rings having a V-shaped cross section with the legs of said V-shape engaging the bottom of said first annular grooves, said first annular grooves having a raised annular shoulder circumscribing said hydraulic line port making line contact with the innermost leg of said metal annular seal ring.

19. A seal plate according to claim 15, wherein said plurality of hydraulic line ports includes a first and a second hydraulic line port, and further including a transverse bore in said body member extending between said first and second hydraulic line ports for permitting fluid passage therebetween.

20. The seal plate as defined by claim 19 and further including:

a transverse channel within said body member communicating with one of said hydraulic line ports;

a blind bore through one face of said body member and communicating with said transverse channel but not extending all the way through said body member; and a fluid channel in said body member extending from the periphery of said body member to said blind bore whereby fluids are permitted to flow from the periphery of said body member to said one of said hydraulic line ports.

21. The seal plate as defined in claim 19 and further including a blind port in said body member for sealing off from fluid flow one of the hydraulic lines.

22. The seal plate as defined by claim 21 wherein said blind port includes a pressure tap.

* * * * *

UNITED STATES PATENT AND TRADEMARK OFFICE
CERTIFICATE OF CORRECTION

PATENT NO. : 4,579,372
DATED : April 1, 1986
INVENTOR(S) : Charles D. Morrill

It is certified that error appears in the above—identified patent and that said Letters Patent is hereby corrected as shown below:

On Column 1, line 36, after "to" change "device" to -- devise --.

On Column 8, line 20, after "valve" change "opening" to -- opener --.

On Column 8, line 43, after "250" change "about" to -- abut --.

Signed and Sealed this

Twenty-second Day of July 1986

[SEAL]

Attest:

DONALD J. QUIGG

Attesting Officer

Commissioner of Patents and Trademarks